(12) United States Patent
Kim et al.

(10) Patent No.: US 9,868,881 B2
(45) Date of Patent: *Jan. 16, 2018

(54) SWELLING TAPE FOR FILLING GAP

(71) Applicant: LG CHEM, LTD., Seoul (KR)

(72) Inventors: Se Ra Kim, Daejeon (KR); Suk Ky Chang, Daejeon (KR); Byung Kyu Jung, Daejeon (KR); Yoon Tae Hwang, Daejeon (KR); Cha Hun Ku, Daejeon (KR); Sung Jong Kim, Daejeon (KR); Se Woo Yang, Daejeon (KR); Hyo Sook Joo, Daejeon (KR); Min Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,933

(22) Filed: Jun. 17, 2014

(65) Prior Publication Data

US 2014/0290829 A1 Oct. 2, 2014

Related U.S. Application Data

(63) Continuation of application No. 13/949,955, filed on Jul. 24, 2013, which is a continuation of application No. PCT/KR2012/000674, filed on Jan. 27, 2012.

(30) Foreign Application Priority Data

Jan. 27, 2011 (KR) .................. 10-2011-0008160
Jan. 27, 2012 (KR) .................. 10-2012-0008564

(51) Int. Cl.
*B32B 41/00* (2006.01)
*C09J 7/02* (2006.01)
(Continued)

(52) U.S. Cl.
CPC ............ *C09J 7/0207* (2013.01); *B32B 37/02* (2013.01); *C09J 7/0246* (2013.01); *C09J 7/0264* (2013.01);
(Continued)

(58) Field of Classification Search
CPC .... H01M 2/0267; H01M 2/08; G02B 6/4494; G02B 6/4407; B01L 2200/0689; B01L 2400/0406; H01B 7/288; Y02E 60/12; H01L 37/288
USPC ............. 156/83; 385/105; 429/94; 174/23 R; 422/504, 527, 947; 436/165; 523/173; 73/864.02
See application file for complete search history.

(56) References Cited

U.S. PATENT DOCUMENTS 4,767,184 A 8/1988 Ogasawara et al.
4,802,732 A 2/1989 Fukuma et al.
(Continued)

FOREIGN PATENT DOCUMENTS

CN 101950811 A 1/2011
CN 102024978 A 4/2011
(Continued)

*Primary Examiner* — Michael N Orlando
*Assistant Examiner* — Joshel Rivera
(74) *Attorney, Agent, or Firm* — Dentons US LLP (57) ABSTRACT

A swelling tape for filling a gap and a method of filling a gap are provided. The swelling tape can be applied within the gap having a fluid to realize a 3D shape thereby filling the gap, and be used to fix a subject forming the gap as necessary.

2 Claims, 3 Drawing Sheets

(51) Int. Cl.
  *H01M 2/10* (2006.01)
  *H01M 10/04* (2006.01)
  *H01M 6/00* (2006.01)
  *H01M 10/02* (2006.01)
  *B32B 37/02* (2006.01)
  *H01M 4/04* (2006.01)
  *B32B 27/36* (2006.01)
  *B32B 27/28* (2006.01)
  *B32B 27/40* (2006.01)
  *B32B 27/30* (2006.01)
  *B32B 27/38* (2006.01)
  *C09J 133/08* (2006.01)

(52) U.S. Cl.
  CPC ............ *H01M 2/10* (2013.01); *H01M 4/04* (2013.01); *H01M 6/005* (2013.01); *H01M 10/02* (2013.01); *H01M 10/04* (2013.01); *H01M 10/049* (2013.01); *H01M 10/0431* (2013.01); *B32B 27/285* (2013.01); *B32B 27/308* (2013.01); *B32B 27/36* (2013.01); *B32B 27/38* (2013.01); *B32B 27/40* (2013.01); *C09J 133/08* (2013.01); *C09J 2203/33* (2013.01); *C09J 2401/006* (2013.01); *C09J 2433/00* (2013.01); *C09J 2433/006* (2013.01); *C09J 2463/00* (2013.01); *C09J 2463/006* (2013.01); *C09J 2475/00* (2013.01); *C09J 2475/006* (2013.01); *Y10T 29/49114* (2015.01); *Y10T 428/24521* (2015.01); *Y10T 428/28* (2015.01); *Y10T 428/287* (2015.01); *Y10T 428/2852* (2015.01); *Y10T 428/2891* (2015.01)

(56) References Cited

U.S. PATENT DOCUMENTS

| | | |
|---|---|---|
| 5,278,079 A | 1/1994 | Gubinski et al. |
| 6,139,953 A * | 10/2000 | Nagamoto et al. ........... 428/343 |
| 8,288,036 B2 | 10/2012 | Kim |
| 2011/0091756 A1 | 4/2011 | Suzuki et al. |

FOREIGN PATENT DOCUMENTS

| | | |
|---|---|---|
| EP | 1189243 A2 | 3/2002 |
| EP | 1507299 A2 | 2/2005 |
| EP | 1561479 A1 | 8/2005 |
| EP | 2276097 A1 | 1/2011 |
| JP | 06-150971 | 5/1994 |
| JP | 06181058 | 6/1994 |
| JP | 2001273933 A | 10/2001 |
| JP | 2003-151634 | 5/2003 |
| KR | 100719725 | 5/2007 |
| KR | 1020070096649 | 10/2007 |
| TW | 201245386 A1 | 11/2012 |

* cited by examiner

SWELLING TAPE FOR FILLING GAP

CROSS-REFERENCE TO RELATED APPLICATION

This application is a continuation of application Ser. No. 13/949,955, filed on Jul. 24, 2014, which is a Continuation Bypass Application of International Patent Application No. PCT/KR2012/000674, filed on Jan. 27, 2012, and claims the benefit of Korean Application No. 10-2011-0008160, filed on Jan. 27, 2011 and Korean Patent Application No. 10-2012-0008564, filed on Jan. 27, 2012, all of which are hereby incorporated herein by reference in their entirety for all purposes as if fully set forth herein.

BACKGROUND

1. Field of the Invention

The present invention relates to a swelling tape for filling a gap and a method of filling a gap.

2. Discussion of Related Art

In general, a gap between two spaced subjects has to be filled. Also, it is often necessary that two subjects spaced apart to form a gap be fixed by filling the gap.

For example, an electrode assembly generally has a smaller size than a cylindrical can when the electrode assembly is received in the cylindrical can to manufacture a battery. Thus, a gap is formed between the electrode assembly and an internal wall of the can. In this case, the electrode assembly received in the can may move inside the can due to an external vibration or an external impact. The movement of the electrode assembly may cause an increase of internal resistance of battery or damage to an electrode tab, thereby greatly deteriorating a performance of the battery. Accordingly, it is necessary to fill the gap and fix the electrode assembly.

SUMMARY OF THE INVENTION

The present invention is directed to providing a swelling tape for filling a gap and a method of filling the gap.

One aspect of the present invention provides a swelling tape for filling a gap. For example, the tape may include a substrate layer, and a pressure-sensitive adhesive layer formed on at least one surface of the substrate layer. The above-described substrate layer having a property of deforming in a longitudinal direction, for example, when the substrate layer comes in contact with a fluid such as a liquid, or may contain a urethane bond, an ester bond, or an ether bond, or include a cellulose ester compound. According to one exemplary embodiment, the substrate layer may be a swelling substrate layer in a longitudinal direction, for example, when the substrate layer comes in contact with a fluid such as a liquid.

The term "swelling tape for filling a gap" used herein may refer to a tape, which functions to fill a gap between two subjects that are spaced apart and fix the two subjects to each other as necessary. According to one exemplary embodiment, the swelling tape may realize a three-dimensional (3D) shape, which can fill the gap by mutual balance between a fixing force of a pressure-sensitive adhesive layer and a force generated by swelling a substrate layer when the substrate layer comes in contact with a fluid such as a liquid, for example, in a state in which the pressure-sensitive adhesive layer is attached via the pressure-sensitive adhesive layer to either of the two subjects having the gap formed therebetween. According to one exemplary embodiment, each of the two subjects, which are spaced apart to form the gap, may be an electrode assembly of a battery and a can receiving the assembly, but the present invention is not limited thereto. In this case, the tape may be, for example, a seal tape for an electrode assembly and may be used to prevent disassembly of the electrode assembly and also to fix the electrode assembly inside the can of a battery.

Figure 1:
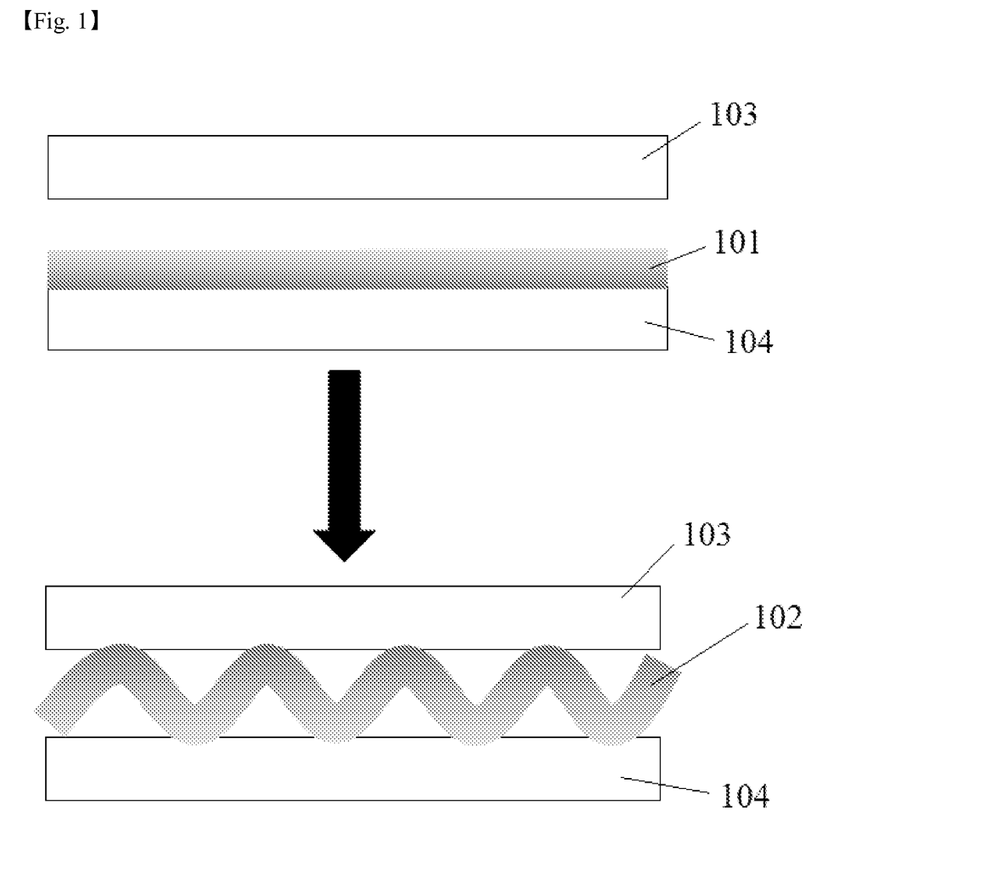
FIG. 1 is a schematic diagram showing a process of forming the swelling tape into a 3D shape.

FIG. 1 is a schematic diagram showing a process of filling a gap through realizing a 3D shape within the gap by the swelling tape.

As shown in FIG. 1, the tape 101 is attached via a pressure-sensitive adhesive layer to any one subject 104 of two subjects 103 and 104 having a gap formed therebetween. A fluid is introduced within the gap in the attached state described above, thereby contacting a substrate layer of the swelling tape 101 and causing the substrate layer to swell in a longitudinal direction, for example. In this case, the swelling tape 102 may realize a 3D shape because the substrate layer is swelled in a state in which the tape 101 is fixed to the subject 104 via the pressure-sensitive adhesive layer. The gap may be filled by the above-described 3D shape and the two subjects 103 and 104 having the gap formed therebetween may be fixed to each other as necessary.

As such, a size of the 3D shape realized by the swelling tape, that is, a width of the gap, may be, for example, in a range of 0.001 mm to 2.0 mm, 0.001 mm to 1.0 mm, or 0.01 mm to 0.5 mm. However, the size of the 3D shape may be varied according to specific kinds of a gap to which the swelling tape is applied, but the present invention is not limited thereto. The size of the 3D shape according to the size of the gap to which the swelling tape is applied may be, for example, controlled by regulating a peel strength of the pressure-sensitive adhesive layer or a strain of the substrate layer as will be disclosed below.

The substrate layer included in the tape may be, for example, a substrate layer having a property of deforming in a longitudinal direction when the substrate layer comes in contact with a fluid such as a liquid. For example, the substrate layer may be a substrate layer having a property of swelling in a longitudinal direction when the substrate layer comes in contact with the fluid.

Throughout this specification, the term "longitudinal direction" used herein may refer to a vertical direction to the direction of thickness (for example, a direction indicated by an arrow shown in FIG. 2) of the substrate layer when the substrate layer is maintained in a flat level. In addition, the term "vertical" or "horizontal" may mean substantially vertical or horizontal within a range in which desired effects are not damaged, and for example, may include errors of $\pm 10°$, $\pm 5°$, or $\pm 3°$.

The substrate layer, which may be deformed, for example, swelled in any direction including a width, length, or diagonal direction, may be used without limitation as long as the substrate layer has a property of deforming, for example, swelling in a longitudinal direction.

According to one exemplary embodiment, the substrate layer may have a strain of 10% or more in a longitudinal direction according to the following Equation 1.

Strain of Substrate layer in Longitudinal direction= $(L_2-L_1)/L_1 \times 100$     [Equation 1]

In Equation 1, $L_1$ represents an initial length of the substrate layer before the substrate layer comes in contact with a fluid; and $L_2$ represents a length of the substrate layer that is measured after the substrate layer contacts the fluid at room temperature or 60° C. for 24 hours.

For the calculation according to Equation 1, a specific kind of fluid that the substrate layer contacts is selected according to a specific state of a gap to be filled, but the present invention is not limited thereto. According to one exemplary embodiment, when the gap to be filled is formed by an electrode assembly and a can receiving the electrode assembly, the fluid may be an electrolyte in a liquid state to be injected inside the can. As such, the term "electrolyte" may refer to an ion conduction medium to be to be used, for example, in a battery, and the like.

In addition, the term "room temperature" in this specification may mean a naturally occurring temperature, which is not a heated or cooled, and for example, may refer to approximately 10° C. to approximately 30° C., approximately 20° C. to approximately 30° C., or approximately 25° C.

A strain of the substrate layer in a longitudinal direction may be deformed according to a size of a 3D shape to be realized, and for example, may be 30% or more, 40% or more, 50% or more, 60% or more, 70% or more, 80% or more or 90% or more. An upper limit of the strain of the substrate layer in the longitudinal direction is not specifically limited. In other words, the higher a value of the strain is, the larger the 3D shape may be realized, and thus the strain may be, for example, controlled according to the size of a desired 3D shape. For example, an upper limit of the strain of the substrate layer may be approximately 500%.

In Equation 1, $L_1$ and $L_2$ represent lengths of the substrate layer before and after the substrate layer comes in contact with the fluid. The length is measured in a predetermined direction with respect to the substrate layer. As long as the direction is equally applied when $L_1$ and $L_2$ are measured, a specific direction of measuring the length is not specifically limited.

For example, when the substrate layer has a rectangular sheet shape, the length of the substrate layer may be a length in a width, length or diagonal direction, or may be a length in any direction on a plane. However, the direction of measuring the length may be equally applied when $L_1$ and $L_2$ are measured, and thus, for example, the width length of the substrate layer is also used as $L_2$ when the width length of the substrate layer is used as $L_1$.

The shape of the substrate layer is not specifically limited, but for example, may be a film or a sheet shape. In addition, the substrate layer with the film or sheet shape may have shapes such as a rectangular, circular, triangular, or amorphous shape.

A material for the substrate layer may include any material that can have the above-described strain. According to one exemplary embodiment, the substrate layer may be a polymer film or sheet, and may be the film or sheet manufactured to have the above-described deformation property when the substrate layer comes in contact with a fluid by the conditions of stretching or shrinking in a manufacturing process.

According to one exemplary embodiment, the substrate layer including a urethane bond, an ester bond, or an ether bond, or a cellulose ester compound may be used as the substrate layer.

The above-described substrate layer may include, for example, an acrylate-based substrate layer, a urethane-based substrate layer, an epoxy-based substrate layer, or a cellulose-based substrate layer.

According to one exemplary embodiment, a cast layer of an active energy ray-curable composition may be used as the acrylate-based, the urethane-based, or the epoxy-based substrate layer.

The term "cast layer" used herein may refer to a substrate layer formed through curing a coating layer after coating a curable composition using a casting method. In addition, the term "active energy ray-curable composition" as described above may refer to a type of a composition cured irradiation with active energy rays. A scope of the active energy rays as described above may also include a particle beam, such as an alpha-particle beam, a proton beam, a neutron beam, and an electron beam as well as microwaves, infrared rays (IR), UV rays (UV), X-ray, and a gamma-ray.

The composition may include, for example, an active energy ray-curable acrylate compound and a radical-polymeriizable diluent.

The active energy ray-curable acrylate compound as described above may include, for example, a urethane acrylate that is known as a photocurable oligomer in the art.

The urethane acrylate may include, for example, a reactant of a mixture including a (meth)acrylate having a hydroxyl group and a polyisocyanate compound. As such, the polyisocyanate compound may be a compound having at least two isocyanate groups; for example, an aliphatic, cycloaliphatic, or aromatic polyisocyanate; and specifically, may include, for example, 2,4-tolylene diisocyanate, 2,6-tolylene diisocyanate, 1,3-xylylene diisocyanate, 1,4-xylylene diisocyanate, diphenylmethane-4,4'-diisocyanate isophorone diisocyanate, and the like. In addition, the (meth)acrylate having the hydroxyl group may include a hydroxyalkyl (meth)acrylate, such as 2-hydroxyethyl (meth)acrylate, 2-hydroxypropyl (meth)acrylate, 4-hydroxybutyl (meth)acrylate, 6-hydroxyhexyl (meth)acrylate, or 8-hydroxyoctyl (meth)acrylate, but the present invention is not limited thereto.

The urethane acrylate may include, for example, a reactant including a (meth)acrylate having a hydroxyl group and a urethane prepolymer having an isocyanate group at the end thereof, for example, a reactant of the mixture including a polyisocyanate and an ester polyol. The ester polyol may include, for example, a polyol and/or an ether polyol; and a reactant that is esterificated with an acid component, such as a dibasic acid or an anhydride thereof. The polyol may include, for example, ethylene glycol, propylene glycol, cyclohexane dimethanol, 3-methyl-1,5-pentanediol, and the like, and the ether polyol may include, for example, a polyalkylene glycol, such as polyethylene glycol, polypropylene glycol, or polytetramethylene glycol, a diol of a block or a random polymer, such as a polyethylene polypropoxy block polymer diol; and the acid component may include, for example, a dibasic acid or an anhydride thereof, such as adipic acid, succinic acid, phthalic acid, tetrahydrophthalic acid, hexahydrophthalic acid, and terephthalic acid, but the present invention is not limited thereto. Also, the (meth)acrylate having the hydroxyl group and the polyisocyanate may include the compounds described above.

Also, the urethane acrylate may be a reactant of the mixture including a (meth)acrylate having a hydroxyl group and a urethane prepolymer having an isocyanate at the end thereof, for example, a reactant a reactant of the mixture including a polyisocyanate and an ether polyol.

Also, the active energy ray-curable acrylate compound may include an epoxy acrylate, a polyester acrylate, a polyether acrylate, and the like.

The polyester acrylate may include, for example, a dehydration condensation reactant of the mixture including a (meth)acrylic acid and an ester polyol. In this case, the above-described compounds may be used as an ester polyol, which can be used.

In addition, the polyether acrylate may include, for example, a polyalkylene glycol di(meth)acrylate, such as polyethylene glycol di(meth)acrylate, polypropylene glycol di(meth)acrylate, or polytetramethylene glycol di(meth)acrylate, and the epoxy acrylate may be an additive reactant of the mixture including a (meth)acrylic acid and an epoxy resin. In this case, a type of the epoxy resin may include a general aromatic or aliphatic epoxy resin that is known in the art, but the present invention is not limited thereto.

The radical polymerizable diluent included in the composition may include, for example, a monomer having a functional group that can participate in a radical polymerization by irradiation with active energy rays.

The monomer may be a (meth)acrylic acid ester monomer, and may be, for example, at least one selected from the group consisting of an alkyl (meth)acrylate; a (meth)acrylate having an alkoxy group, a (meth)acrylate having an alicyclic group; a (meth)acrylate having an aromatic group; a (meth)acrylate having a heterocycle; and a multifunctional acrylate.

The alkyl (meth)acrylate may include, for example, an alkyl (meth)acrylate having an alkyl group having 1 to 20 carbon atoms, such as methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate; the (meth)acrylate having the alkoxy group may include, for example, 2-(2-ethoxyethoxy)ethyl (meth)acrylate, ethylene glycol phenyl ether (meth)acrylate, polyethylene glycol (with a degree of polymerization of 2 to 8) phenyl ether (meth)acrylate, ethylene glycol nonyl phenyl ether (meth)acrylate, polyethylene glycol (with a degree of polymerization of 2 to 8) nonyl phenyl ether (meth)acrylate, and the like; the (meth)acrylate having an alicyclic group may include, for example, isobornyl(meth)acrylate, dicyclopentenyl (meth)acrylate, dicyclopentenyloxy (meth)acrylate, and the like; the (meth)acrylate having the aromatic group may include, for example, phenylhydroxypropyl (meth)acrylate, benzyl (meth)acrylate, and the like; the (meth)acrylate having the heterocycle may include, for example, tetrahydrofurfuryl (meth)acrylate, morpholinyl (meth)acrylate, and the like; the multifunctional acrylate may include, for example, a difunctional acrylate, such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxyl puivalic acid neopentyl glycol di(meth)acrylate, dicyclopentanyl di(meth)acrylate, caprolactone-modified dicyclopentenyl di(meth)acrylate, ethylene oxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentyl glycol modified trimethylpropane di(meth)acrylate, adamantane di(meth)acrylate, or 9,9-bis[4-(2-acryloyloxyethoxy)phenyl]fluorene; a trifunctional acrylate, such as trimethylolpropane tri(meth)acrylate, dipentaerythritol tri(meth)acrylate, propionic acid modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; a tetrafunctional acrylate, such as diglycerin tetra(meth)acrylate, or pentaerythritol tetra(meth)acrylate; a pentafunctional acrylate, such as propionic acid-modified dipentaerythritol penta(meth)acrylate; and a hexafunctional acrylate, such as depentaerythritol hexa(meth)acrylate, caprolactone-modified dipentaerythritol hexa(meth)acrylate, or a urethane (meth)acrylate (for example, a reactant of a trimethylolpropane tri(meth)acrylate and an isocyanate monomer); but the present invention is not limited thereto.

Also, the diluent may include a monomer having a polar functional group, specifically, a monomer having a hydroxyl group, a carboxyl group, a nitrogen-containing group, or a glycidyl group. The monomer having the hydroxyl group may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, and the like; the monomer having the carboxyl group may include (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid, or maleic anhydride, and the like; the monomer having the nitrogen-containing group may include (meth)acrylamide, N-vinyl pyrrolidone, N-vinyl carprolactam, and the like; and the monomer having the glycidyl group may include glycidyl (meth)acrylate, and the like; but the present invention is not limited thereto.

The acrylic composition may include, for example, 30 parts by weight to 99 parts by weight of the active energy ray-curable acrylate compound and 1 part by weight to 70 parts by weight of the radical polymerizable diluent. However, the weight percentages and the types of the acrylate compound and the radical-polymerizable diluent may be varied considering a desired strain, for example.

Unless otherwise indicated, the unit "part by weight" used herein refers to a weight ratio.

Also, the composition may further include a photoinitiator. The photoinitiator may induce a polymerization reaction of the composition by irradiation with active energy rays.

The photoinitiator may include, for example, a known photoinitiator such as a benzoin-based, hydroxyketone-based, aminoketone-based, peroxide-based, or phosphine oxide-based photoinitiator.

The composition may include 0.01 parts by weight to 10 parts by weight or 0.1 parts by weight to 5 parts by weight of the photoinitiator based on the total 100 parts by weight of the acrylate compound and diluent. The content of the photoinitiator may be controlled within the above-described range to induce an effective curing reaction and prevent a degradation of physical properties, and the like, caused by components remaining after curing process.

The composition may further include at least one additive selected from the group consisting of a pigment and a dye, an epoxy resin, a crosslinking agent, a UV stabilizer, an antioxidant, a toning agent, a reinforcing agent, a filling agent, a antifoaming agent, a surfactant, a photo thickener, and a plasticizer, as necessary.

The cast layer may be manufactured by coating the composition to a proper thickness using a casting method and curing the composition through polymerization by irradiation with the active energy rays.

A specific method of casting the composition may be performed in a method such as bar coating, knife coating, roll coating, spray coating, gravure coating, curtain coating, comma coating or lip coating considering a desired thickness, for example, but the present invention is not limited thereto.

In addition, the irradiation with the active energy rays, for example, ultraviolet rays (UV rays), may be performed by using a metal halide lamp, a high-pressure mercury lamp, a black light lamp, an induction lamp, a xenon lamp, and the like. The conditions for irradiating the active energy rays, for example, a wavelength, the light intensity of radiation, and the like, may be selected considering composites of the composition, and the like, but the present invention is not specifically limited thereto.

Also, for example the urethane substrate layer may include a urethane resin, such as thermoplastic polyurethane (TPU), for example, but may include a cast layer of the curable urethane composition.

The curable urethane composition may be a type of a composition that is cured by application of heat, for example, and may include a composition including a polyol and an isocyanate compound.

The polyol may include, for example, an alkylene glycol, a dialkylene glycol, a benzenediol (for example, catechol, resorcinol, or hydroquinone), a benzenetriol (for example, 1,2,3-benzenetriol), a dialcohol amine, a trialcohol amine, arabitol, mannitol, isomalt, glycerol, xylitol, sorbitol, maltitol, erythritol, ribitol, dulcitol, lactitol, threitol, iditol or polyglycitol, and the like. In addition, the isocyanate compound may include, for example, a polyisocyanate as described in a list of the urethane acrylate. The alkylene included in the alkylene glycol or the dialkylene glycol may include, for example, an alkylene having 1 to 20 carbon atoms, 1 to 16 carbon atoms, 1 to 12 carbon atoms, 1 to 8 carbon atoms or 1 to 4 carbon atoms.

The curable urethane composition may include, for example, a polyol and a polyisocyanate so that an equivalent ratio of a hydroxyl group (OH) of the polyol and an isocyanate group (NCO) of the polyisocyanate can amount to substantially approximately 1:1. However, the equivalent ratio may be varied, for example, considering a desired strain, and the like.

The cast layer may be manufactured by casting the urethane composition in a method similar to that of the composition, and then curing the urethane composition through application of proper heat to the casted coating layer.

When a cellulose-based substrate layer is used as the substrate layer, the substrate layer may include a cellulose acetate resin or cellulose alkylate resin. In this case, a substrate layer manufactured by subjecting the mixture including the above resin to an extruding or casting process may be used. The cellulose alkylate may include, for example, cellulose acetate propionate, cellulose acetate butyrate, and the like.

A method of manufacturing the substrate layer using the resin may include, for example, applying a raw material including the above resin and known additives as necessary in a general film or sheet molding process such as extruding or casting, but also applying a proper treatment in a molding process in order for the substrate layer to exhibit a deformation property, for example, an swelling property, but the present invention is not specifically limited thereto.

When the substrate layer is a sheet or film type, the thickness of the substrate layer may be selected considering a size of a gap to be filled or an probability of realization of a desired 3D shape, and the like, for example, but the present invention is not limited thereto.

Figure 2:
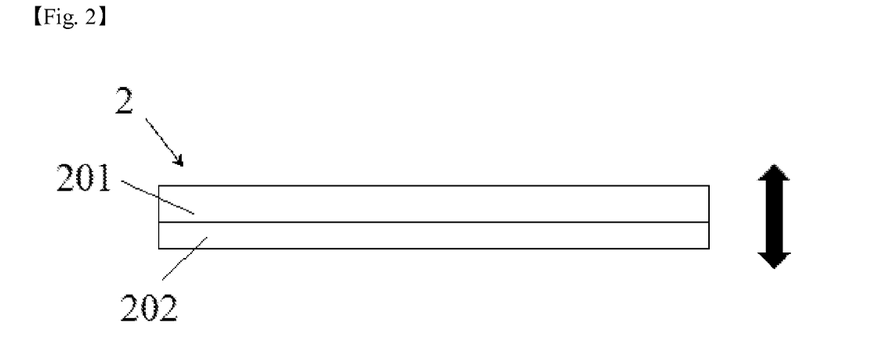
FIG. 2 is a schematic diagram showing the swelling tape.

The tape may include a pressure-sensitive adhesive layer formed on at least one surface of the substrate layer. For example, the pressure-sensitive adhesive layer may be formed on at least one surface of the substrate layer in a horizontal direction to a longitudinal direction of the above-described substrate layer. FIG. 2 is a schematic cross-sectional diagram of the tape, showing a tape 2 including a pressure-sensitive adhesive layer 202, in which the pressure-sensitive adhesive layer 202 is formed at one surface of the substrate layer 201 in a horizontal direction to the longitudinal direction of the substrate layer 201.

The tape may realize a 3D shape, which protrudes in a vertical direction to the longitudinal direction of the substrate layer by deforming, for example, swelling through contacting the tape with a fluid in a state in which the tape is fixed by the pressure-sensitive adhesive layer that is formed in a horizontal direction to the longitudinal direction of the substrate layer as described above.

In order to realize the 3D shape, the pressure-sensitive adhesive layer may be designed to have a proper peel strength. For example, when the peel strength is less than the range for realizing a desired 3D shape, the pressure-sensitive adhesive layer may not properly support stress from deformation of the substrate layer, for example, swelling, and thus the tape may be peeled or the 3D shape may be difficult to realize. On the other hand, when the peel strength is above the range of the peel strength, the pressure-sensitive adhesive layer may excessively inhibit the deformation of the substrate layer and thus the 3D shape may be difficult to realize. The peel strength may be, for example, 100 gf/25 mm or more, 150 gf/25 mm or more, 200 gf/25 mm or more, 300 gf/25 mm or more, 400 gf/25 mm or more, 500 gf/25 mm or more, 600 gf/25 mm or more, 700 gf/25 mm or more, 800 gf/25 mm or more, 900 gf/25 mm or more, 1,000 gf/25 mm or more, 1,100 gf/25 mm or more, 1,200 gf/25 mm or more, 1,300 gf/25 mm or more, 1,400 gf/25 mm or more, 1,500 gf/25 mm or more, 1,600 gf/25 mm or more, 1,700 gf/25 mm or more, or 1,800 gf/25 mm or more. However, the peel strength may be, for example, changed according to a gap to be filled or a size of a 3D shape to be realized, for example, but the present invention is not specifically limited thereto. The peel strength may be, for example, a peel strength to a glass plate or for any one of the subjects forming a gap to be filled. In addition, the peel strength may be measured at room temperature, and may be measured at a peel rate of 5 mm/sec and a peel angle of 180°.

In addition, the peel strength of the pressure-sensitive adhesive layer may be controlled considering an probability of realizing a desired 3D shape, and an upper limit of the peel strength is not specifically limited.

Various kinds of pressure-sensitive adhesive layers may be used as the pressure-sensitive adhesive layer as long as they can exhibit the above-described peel strength. For example, an acrylic pressure-sensitive adhesive, a urethane pressure-sensitive adhesive, an epoxy pressure-sensitive adhesive, a silicon pressure-sensitive adhesive, or a rubber-based pressure-sensitive adhesive, and the like, may be used for the pressure-sensitive adhesive layer.

According to one exemplary embodiment, the pressure-sensitive adhesive layer may be an acrylic pressure-sensitive adhesive layer, and for example, may include an acrylic polymer cross-linked by a multifunctional crosslinking agent.

The acrylic polymer may include, for example, an acrylic polymer having a weight average molecular weight (Mw) of 400,000 or more. The weight average molecular weight is a conversion value to standard polystyrene that is measured by gel permeation chromatography (GPC). Unless otherwise indicated, the term "molecular weight" that may be used herein refers to a weight average molecular weight. An upper limit of the molecular weight of the acrylic polymer may be controlled within 2,500,000 or less, for example, but the present invention is not specifically limited thereto.

The acrylic polymer may include, for example, a copolymerizable monomer having a crosslinkable functional group and a (meth)acrylic acid ester monomer in a polymerized type. In this case, the weight ratio of each monomer may be designed considering a desired peel strength, for example, but the present invention is not specifically limited thereto.

The (meth)acrylic acid ester monomer included in the polymer may include, for example, an alkyl (meth)acrylate, and may include an alkyl (meth)acrylate having an alkyl group 1 to 14 carbon atoms considering cohesiveness, a glass transition temperature, or adhesion of the pressure-sensitive adhesive. The monomer may include, for example, one, two or more of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate, and the like, but the present invention is not limited thereto.

The copolymerizable monomer having the crosslinkable functional group may be co-polymerized with the (meth)acrylic acid ester monomer or another monomer included in the polymer, and may give a crosslinking point that can react with a multifunctional crosslinking agent to a main chain of the polymer after copolymerization. The crosslinkable functional group may be a hydroxyl group, a carboxyl group, an isocyanate group, a glycidyl group, an amide group, and the like. In some cases, the crosslinkable functional group may be a photocrosslinkable functional group, such as an acryloyl group, or a methacryloyl group. The photocrosslinkable functional group may be introduced by reacting the crosslinkable functional group provided by the copolymerizable monomer with the compound having a photocrosslinkable functional group. Various copolymerizable monomers, which can be used according to a desired functional group, are known in the field of preparing pressure-sensitive adhesives. An example of the monomer may be a monomer having a hydroxyl group, such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, or 2-hydroxypropylene glycol (meth)acrylate; monomer having a carboxyl group, such as (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid, and maleic anhydride; glycidyl (meth)acrylate, (meth)acrylamide, N-vinyl pyrrolidone, N-vinyl caprolactam, and the like; but the present invention is not limited thereto. One, two of more of the monomers may be included in the polymer.

The acrylic polymer may further include another functional comonomer in a polymerized type as necessary, and for example, may be a monomer represented by the following Formula 1.

[Formula 1]

In Formula 1, $R_1$ to $R_3$ are each independently a hydrogen or an alkyl; and $R_4$ is a cyano; an alkyl-substituted or unsubstituted phenyl; an acetyl oxy; or $COR_5$, wherein $R_5$ is an alkyl or alkoxyalkyl-substituted or unsubstituted amino or a glycidyl oxy.

The alkyl or alkoxy in definitions of $R_1$ to $R_5$ in Formula 1 refers to an alkyl or alkoxy of $C_1$ to $C_8$, and preferably, a methyl, an ethyl, a methoxy, an ethoxy, a propoxy, or a butoxy.

A specific example of the monomer of Formula 1 may be a vinyl ester of carboxylic acid, such as (meth)acrylo nitrile, N-methyl (meth)acrylamide, N-butoxy methyl (meth)acrylamide, styrene, methyl styrene, or vinyl acetate, but the present invention is limited thereto.

The acrylic polymer may be prepared, for example, through solution polymerization, photo polymerization, bulk polymerization, suspension polymerization, emulsion polymerization, and the like.

Kinds of the multifunctional crosslinking agent that functions to crosslink the acrylic polymer in the pressure-sensitive adhesive layer is not particularly limited, but a proper crosslinking agent may be selected from known crosslinking agents, such as an isocyanate crosslinking agent, an epoxy crosslinking agent, an aziridine crosslinking agent, a metal chelate crosslinking agent, or a photocrosslinking agent, according to a kind of crosslinkable functional group present in the polymer. An example of the isocyanate crosslinking agent may be a diisocyanate, such as tolilene diisocyanate, xylene diisocyanate, diphenylmethane diisocyanate, hexamethylene diisocyanate, isophorone diisocyanate, tetramethylxylene diisocyanate, or naphthalene diisocyanate, or a reactant of the diisocyanate and a polyol, and the like. Here, trimethylol propane may be used as the polyol. The epoxy crosslinking agent may include ethylene glycol diglycidylether, triglycidylether, trimethylolpropane triglycidylether, N,N,N',N'-tetraglycidyl ethylenediamine, glycerin diglycidylether, and the like; the aziridine crosslinking agent may include N,N'-toluene-2,4-bis(1-aziridinecarboxamide), N,N'-diphenylmethane-4,4'-bis(1-aziridinecarboxamide), triethylene melamine, bisisoprotaloyl-1-(2-methylaziridine), tri-1-aziridinylphosphineoxide, and the like; the metal chelate crosslinking agent may include compounds with a multivalent metal coordinated at a compound, such as acetyl acetone or ethyl acetoacetate. In this case, the multivalent metal may include aluminum, iron, zinc, tin, titanium, antimony, magnesium or vanadium, and the like; and the photocrosslinking agent may include a multifunctional acrylate, and the like. One, two or more of the crosslinking agents may be used considering a kind of crosslinkable functional group included in the polymer.

A weight ratio of the multifunctional crosslinking agent in the pressure-sensitive adhesive layer may be controlled, for example, considering a desired peel strength, for example.

The above-described pressure-sensitive adhesive layer may be formed, for example, by coating a coating solution obtained by mixing the acrylic polymer and multifunctional crosslinking agent as described above, and then inducing a crosslinking reaction of the polymer and multifunctional crosslinking agent under the proper conditions.

The pressure-sensitive adhesive layer may further include at least one additive selected from the group consisting of a coupling agent, a tackifier, an epoxy resin, a UV stabilizer, an antioxidant, a toning agent, a reinforcing agent, a filling agent, a antifoaming agent, a surfactant, and a plasticizer within a range that does not affect desired purposes.

A thickness of the pressure-sensitive adhesive layer may be properly selected according to an applied use, for example, a desired peel strength, an probability of realizing a 3D shape, a size of gap to be filled, and the like, but the present invention is not specifically limited thereto.

The tape may further include a release sheet attached to the pressure-sensitive adhesive layer in order to protect the pressure-sensitive adhesive layer before using the tape.

Another aspect of the present invention is directed to providing a method of filling a gap. An exemplified method may be a method of filling a gap formed between a first substrate and a second substrate, which is spaced away from the first substrate. For example, the method may include attaching the pressure-sensitive adhesive layer of the swelling tape to the first substrate or second substrate, and deforming, for example, swelling the substrate layer in a longitudinal direction by bringing the substrate layer of the swelling tape into contact with a fluid.

Specific kinds and shapes of the first substrate and second substrate that form the gap in the method are not specifically limited. In other words, the categories of the first substrate and second substrate may include all kinds of substrates that may form a gap to be filled and in which a fluid may be introduced into the gap.

In addition, a shape of the substrate is not specifically limited, but the substrate may, for example, include substrates having bent or irregular shapes, as well as a flat shape as shown in FIG. 1. According to one exemplary embodiment, a width of the gap formed between the first substrate and second substrate may be approximately 0.001 mm to 2.0 mm, 0.001 mm to 1.00 mm, or 0.01 mm to 0.5 mm, but the present invention is not limited thereto.

As seen in FIG. 1, the method may be performed by forming a tape 102 having a 3D shape through swelling by bring the substrate layer in contact with a fluid in a state in which the tape 101 is attached via a pressure-sensitive adhesive layer to one of a first substrate 103 and a second substrate 104 forming a gap.

According to one exemplary embodiment, either of the first substrate and second substrate used in the method may be an electrode assembly for a battery and the other may be a can receiving the assembly; and the fluid contacting the tape may be an electrolyte included in the battery.

In this case, for example, the method may be performed in a method of attaching the tape to the electrode assembly, accommodating the electrode assembly inside the can, and then injecting an electrolyte into the can.

A specific kind of the electrode assembly may include any general assembly used in the art, but the present invention is not specifically limited. According to one exemplary embodiment, the electrode assembly may be an electrode assembly for a secondary battery, for example, a lithium second battery.

The electrode assembly may include a positive electrode plate; a negative electrode plate; and a separator formed between the positive electrode plate and negative electrode plate, and the swelling tape may be attached onto the outer circumferential surface of the electrode assembly using the pressure-sensitive adhesive layer as a mediator in the above-described method. The electrode assembly may be coiled in a jellyroll shape in some cases.

The positive electrode plate may include a positive electrode collector composed of a sheet metal with excellent conductivity, and the like; and a positive electrode active material layer that is coated on the surface of the positive electrode collector. In addition, an area that is not coated with the positive electrode active material may be formed on both ends of the positive electrode plate, and a positive electrode tab that protrudes to a predetermined length from an upper part or bottom part of the electrode assembly may be attached to the above-described area. The positive electrode tab may play a role in electrically connecting the electrode assembly with other parts of a battery, electronically.

In addition, the negative electrode plate may include a negative electrode collector composed of a conductive sheet metal, and the like; and a negative electrode active material layer that is coated on the surface of the negative electrode collector. In addition, an area that is not coated with the negative electrode active material may be formed on both ends of the negative electrode plate, like the positive electrode plate, and a negative electrode tab, which protrudes to a predetermined length from an upper part or bottom part of the electrode assembly and can electronically connect the electrode assembly and other parts of a battery, may be attached to the above-described area.

In addition, the electrode assembly may further include an insulation plate formed on an upper part and/or bottom part in order to prevent contact with a cap assembly or a cylindrical can.

Since the swelling tape includes a closing part in which an outermost end of the separator at the outer circumferential surface of the electrode assembly is positioned, the swelling tape may be attached to the electrode assembly to surround the outer circumferential surface of the electrode assembly. In addition, the swelling tape may be attached to cover at least 30% of the total area of the outer circumferential surface of the electrode assembly. In this case, an upper end part and bottom end part of the outer circumferential surface of the electrode assembly may be attached so that the electrode assembly can be exposed to external environments.

A kind of the can receiving the electrode assembly may include, for example, a cylindrical can, and the like, which are known in the art, but the present invention is not specifically limited thereto.

In addition, a kind of the electrolyte, a fluid that can deform, for example, swell, the tape, may include an electrolyte known in the art according to a kind of a battery, but the present invention is not specifically limited thereto. For example, when the battery is a lithium secondary battery, the electrolyte may include, for example, a water-insoluble organic solvent and a lithium salt. The above-described lithium salt may be dissolved in an organic solvent to serve as a source of lithium ions in a battery and may accelerate a movement of the lithium ions between a positive electrode and a negative electrode. An example of the lithium salt may be a lithium salt including one, two or more of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (here, x and y are natural numbers), LiCl, LiI, lithium bisoxalate borate, and the like, as a supporting electrolytic salt. A concentration of the lithium salt in the electrolyte may be varied according to its application, and may be generally within the range of 0.1 M to 2.0 M. In addition, the organic solvent may serve as a medium that can move ions involved in an electro-chemical reaction of a battery, and examples of the organic solvent may include one, two or more of benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (wherein R is a hydrocarbon radical with a linear, branched or circular structure having 2 to 50 carbon atoms, in which the hydrocarbon radical may include a double bond, an aromatic ring, or an ether bond, and the like), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butylolactone, sulfolane, valerolactone, decanolide, or mevalolacton, but the present invention is not limited thereto.

A pressure-sensitive adhesive layer, which has a predetermined peel strength with respect to a substrate layer with a deformation property, for example, an swelling property, as described above, is formed on the swelling tape. Accordingly, the tape may realize the 3D shape after the tape is subjected to the method, for example, in a state in which the tape is attached to an electrode assembly. As a result, the tape may effectively fill a gap between the internal wall of the electrode assembly and the can and fix the electrode assembly, thereby preventing movement or shaking.

In other words, the "3D shape" of the swelling tape may be formed through interaction of a deformation ability of a substrate layer of the swelling tape contacting an electrolyte and a peel strength of the pressure-sensitive adhesive layer, and may be a concept including any structure that can firmly fix an electrode assembly inside the can.

Figure 3:
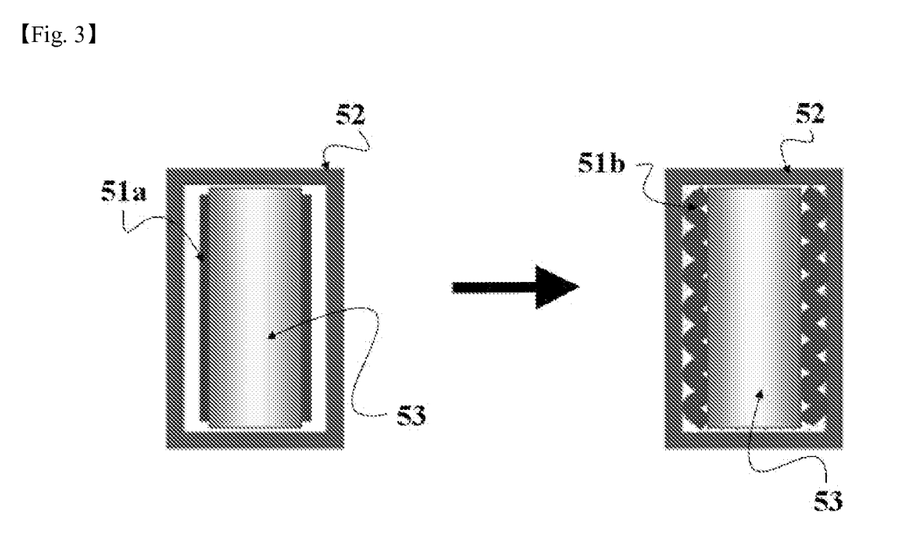
FIG. 3 is a schematic diagram showing a process of forming the swelling tape into a 3D shape in a process of manufacturing a battery.

FIG. 3 is a diagram of an exemplified battery manufactured by the above-described method, showing swelling tapes 51a and 51b forming a 3D shape by means of an electrolyte so that an electrode assembly 53 can be fixed in a can 52.

For example, as shown in an exemplified left diagram of FIG. 3, the swelling tape 51a may be maintained in a flat shape when inserted into the can 52 after being attached to the assembly 53. However, after a considerable amount of time after contacting the electrolyte injected into the can 52, as exemplarily shown in a right diagram of FIG. 3, the swelling tape 53b may form a 3D shape, and thus it can be possible to fill a gap between the electrode assembly 53 and the can 52 and fix the electrode assembly 53.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be realized in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Hereinafter, the swelling tape will be described in further detail with reference to Examples and Comparative Examples, but the categories of the swelling tape will not be limited to the following Examples.

As described below, physical properties in Examples and Comparative Examples were evaluated by the following methods.

1. Measurement of Strain of Substrate Layer in Longitudinal Direction

A substrate layer was cut to be 10 mm wide and 50 mm long to prepare a specimen. The prepared specimen was impregnated in a carbonate-based electrolyte, and then was maintained at room temperature for 1 day in a sealed state. Then, the specimen was removed from the electrolyte; a height of the specimen was measured; and then a strain of the substrate layer in a longitudinal direction was measured based on the following Equation A:

Strain in Longitudinal direction=$(L_2-L_1)/L_1\times 100$     [Equation A]

In Equation A, $L_1$ is an initial length of the substrate layer in a longitudinal direction before the substrate layer is impregnated in an electrolyte, that is, 50 mm; and $L_2$ is a length of the substrate layer in a longitudinal direction after the substrate layer is impregnated in an electrolyte.

2. Measurement of Peel Strength of Swelling Tape

A swelling tape was cut to be 25 mm wide and 200 mm long to prepare a specimen. The specimen was attached via a pressure-sensitive adhesive layer to a glass plate using a 2-kg rubber roller, and then stored at room temperature for 2 hours. Then, a peel strength was measured while a swelling tape was peeled with a peel rate of 5 mm/sec and a peel angle of 180° using a tensile tester.

3. Evaluation of Probability of Realizing a 3D Shape by Swelling Tape

The batteries manufactured in Examples and Comparative Examples were stored at room temperature for 1 day, and then were disassembled to remove electrode assemblies. Probability of realization of 3D shapes was evaluated by evaluating conditions of swelling tapes that were attached to the electrode assemblies according to the following criteria:

<Evaluation Criteria of Probability of Realizing 3D Shape>

◯: A 3D shape of a swelling tape is observed.

Δ: A 3D shape of a swelling tape is not observed.

X: A 3D shape of a swelling tape is not observed and the tape is peeled from an electrode assembly.

4. Evaluation of Ability of Swelling Tape to Fill Gap (Ability to Prevent Movement of Electrode Assembly)

An ability of a swelling tape to fill a gap may be measured using a method of evaluating a property of preventing a movement of an electrode assembly. For example, the above-described method includes a method of evaluating a residual vibration and a method of evaluating a residual impact. The method of evaluating the residual vibration is performed according to a vibration test of UN38.3 standard and it is judged that a terminal is disconnected by a movement when a power of a battery is not sensed after evaluation. For the way of evaluating the residual impact, a terminal is judged to be disconnected by a movement when a power of a battery is not sensed a fixed time after a battery is added to an octagonal cylinder and then is spun. The abilities of the swelling tapes to fill gaps, which were evaluated as described above, were evaluated according to the following criteria:

<Evaluation Criteria of Ability to Fill Gap>

◯: A power of a battery is measured after evaluations of a residual vibration and a residual impact.

Δ: A power of a battery is measured after evaluations of a residual vibration and a residual impact, but the resistivity is increased 10% or more.

X: A power of a battery is not measured after evaluations of a residual vibration and a residual impact.

Preparative Example 1. Manufacture of Urethane-Based Substrate Layer

A film having a thickness of approximately 40 μm was formed with a composition including butanediol polyol and methylene diphenyl diisocyanate with an equivalent ratio of approximately 1:1 of the hydroxyl group of the polyol and the isocyanate group of the diisocyante, using T-die, and then cured to manufacture a substrate. A strain of the manufactured substrate in a longitudinal direction was approximately 100%.

Preparative Example 2. Manufacture of Urethane Acrylic-Based Substrate Layer After mixing 40 parts by weight urethane acrylate and 70 parts by weight isobornyl acrylate (IBOA) as a diluent, 0.5 parts by weight of a photoinitiator (Irgacure-184, 1-hydroxyl cyclohexyl phenylketone) was further added, mixed, and defoamed to prepare a composition. The prepared composition was coated on a polyester release film to have a thickness of approximately 40 μm using a bar coater. The polyester release film was covered on the coating layer in order to prevent contact of oxygen and then the composition was cured by irradiation with light of the UV-A region at a radiation intensity of 800 mJ/cm$^2$ using a metal halide lamp to manufacture a substrate layer. A strain of the manufactured substrate layer in a longitudinal direction was approximately 43%.

Preparative Example 3: Manufacture of Epoxy Acrylic-Based Substrate Layer

After mixing 60 parts by weight epoxy acrylate, 38 parts by weight IBOA, and 2 parts by weight acrylic acid, 1.2 parts by weight of a photoinitiator (Irgacure-184, 1-hydroxyl cyclohexyl phenylketone) was further added, mixed, and defoamed to prepare a composition. The prepared composition was coated on a polyester release film to have a thickness of approximately 40 μm using a bar coater. The polyester release film was covered on the coating layer in order to prevent contact of oxygen and then the composition was cured by irradiation with light of the UV-A region at a radiation intensity of 800 mJ/cm$^2$ using a metal halide lamp to manufacture a substrate layer. A strain of the manufactured substrate layer in a longitudinal direction was approximately 11%.

Preparative Example 4. Manufacture of Cellulose-Based Substrate Layer

A raw material including a cellulose acetate propionate compound having a number average molecular weight (Mn) of 70,000 as measured by GPC was molded as a substrate layer having a thickness of approximately 40 μm using T-die. A strain of the manufactured substrate layer in a longitudinal direction was approximately 20%.

Example 1. Manufacture of Swelling Tape

A swelling tape was manufactured by forming a pressure-sensitive adhesive layer having a thickness of 15 μm and a peel strength of 1,900 gf/25 mm with respect to a glass plate as an acrylic-based pressure-sensitive adhesive layer including an acrylic adhesive resin, which is crosslinked with an isocyanate crosslinking agent, on one surface of the urethane-based substrate layer (thickness of 40 μm) manufactured in Preparative Example 1.

Manufacture of Electrode Assembly and Battery

A swelling tape was attached to cover approximately 50% of the outer circumferential surface of a jelly roll-shaped electrode assembly (cross-sectional diameter of 17.2 mm) in which the electrode assembly includes a negative electrode, a positive electrode and a separator, and then the electrode assembly was inserted into a cylindrical can (cross-sectional diameter of 17.5 mm) Subsequently, a carbonate-based electrolyte was injected into the can, which was then sealed to complete a battery.

Examples 2 to 4 and Comparative Examples 1 and 2

Swelling tapes and batteries were manufactured in the same manner as in Example 1, except that substrate layers were changed as shown in the following Table 1, and the pressure-sensitive adhesive layer based on the same composites as in Example 1 was used; but peel strengths of the pressure-sensitive adhesive layers to a glass were changed as shown in the following Table 1 when the swelling tapes were manufactured.

TABLE 1

|  |  | Examples | | | | Comparative Examples | |
|---|---|---|---|---|---|---|---|
|  |  | 1 | 2 | 3 | 4 | 1 | 2 |
| Substrate layer | Kinds | Preparative Example 1 | Preparative Example 2 | Preparative Example 3 | Preparative Example 4 | PP | PET |
|  | Strain | 100 | 43 | 11 | 20 | 0 | 0 |
| Pressure-sensitive adhesive layer | Composition | Acrylic | Acrylic | Acrylic | Acrylic | Acrylic | Acrylic |
|  | Peel strength | 1900 | 900 | 150 | 2000 | 1500 | 60 |

Strain: Strain of Substrate layer in Longitudinal direction (Unit: %)
Peel strength: Peel strength to Glass Plate (Unit: gf/25 mm)
PP: Polypropylene Substrate layer with Strain of 0% in Longitudinal direction (Thickness: 40 μm)
PET: Polyethylene Terephthalate Substrate layer with Strain of 0% in Longitudinal direction (Thickness: 25 μm)

Physical Properties measured for the above Examples and Comparative Examples are summarized and listed in the following Table 2.

TABLE 2

|  | Examples | | | | Comparative Examples | |
|---|---|---|---|---|---|---|
|  | 1 | 2 | 3 | 4 | 1 | 2 |
| Probability of realization of 3D shape | ○ | ○ | ○ | ○ | Δ | Δ |
| Ability to Fill Gap (Ability to Prevent Movement) | ○ | ○ | ○ | ○ | X | X |

The swelling tape can be, for example, applied within a gap having a fluid to realize a 3D shape thereby filling the gap and be used to fix a subject forming a gap as necessary.

While the invention has been shown and described with reference to certain exemplary embodiments thereof, it will be understood by those skilled in the art that various changes in form and details may be made therein without departing from the scope of the invention as defined by the appended claims.

What is claimed is:
1. A swelling tape for filling a gap, comprising:
a substrate layer that deforms along a longitudinal direction when coming in contact with a fluid and that includes a urethane bond, an ester bond or an ether bond, or a cellulose ester compound; and
a pressure-sensitive adhesive layer formed on one surface of the substrate layer in a direction parallel to a longitudinal direction of the substrate layer,
wherein the substrate layer is a single layer consisting essentially of an acrylate-based substrate layer, a urethane-based substrate layer, an epoxy-based substrate layer or a cellulose-based substrate layer,
wherein the acrylate-based substrate layer or the epoxy-based substrate layer is a cast layer of an active energy ray-curable composition, wherein the urethane-based substrate layer is a cast layer of an active energy ray-curable composition or a curable urethane composition or comprises only a thermoplastic polyurethane as a resin component, wherein the cellulose-based substrate layer comprises only a cellulose acetate resin or cellulose alkylate resin as a resin component,
wherein a three-dimensional structure with a height of 0.001 mm to 2.0 mm is formed along a vertical direction to the longitudinal direction when the substrate contacts a fluid,
wherein the three-dimensional structure includes a shape protruding along the vertical direction and wherein a plurality of the shapes are included in the three-dimensional structure, and
wherein the substrate layer has a strain of at least 10% in a longitudinal direction according to the following Equation 1:

$$\text{Strain in Longitudinal direction} = (L_2 - L_1)/L_1 \times 100, \quad \text{[Equation 1]}$$

wherein $L_1$ is an initial length of the substrate layer before the substrate layer comes in contact with the fluid; and $L_2$ is a length of the substrate layer, which is measured after the substrate layer comes in contact with the fluid at room temperature or 60° C. for 24 hours.

2. A method of filling a gap, which is formed by a first substrate and a second substrate spaced apart from the first substrate, comprising:
attaching a pressure-sensitive adhesive layer of the swelling tape according to claim 1 to the first substrate or the second substrate; and
deforming the substrate layer in a longitudinal direction by bringing the substrate layer of the swelling tape in contact with a fluid.

* * * * *